United States Patent [19]

Wieder et al.

[11] 4,378,456
[45] Mar. 29, 1983

[54] TERPOLYMERS OF ETHYLENE, BUTADIENE AND ISOPRENE AND A PROCESS FOR THEIR PREPARATION

[75] Inventors: Wolfgang Wieder, Lillbonne, France; Josef Witte, Cologne, Fed. Rep. of Germany

[73] Assignee: Bayer Aktiengesellschaft, Leverkusen, Fed. Rep. of Germany

[21] Appl. No.: 301,988

[22] Filed: Sep. 14, 1981

[30] Foreign Application Priority Data

Sep. 19, 1980 [DE] Fed. Rep. of Germany ....... 3035358

[51] Int. Cl.$^3$ .............................................. C08F 4/76
[52] U.S. Cl. .................................. 526/169.2; 526/337

[58] Field of Search .............................. 526/337, 169.2

[56] References Cited

U.S. PATENT DOCUMENTS 3,883,493  5/1975  Yamao et al. ....................... 526/337
4,288,581  9/1981  Wieder et al. ..................... 526/169.2

Primary Examiner—Stanford M. Levin
Attorney, Agent, or Firm—Connolly and Hutz

[57] ABSTRACT

Ethylene-butadiene-isoprene terpolymers consisting of more than 80 mol % of alternating ethylene-diene units and in which more than 95 mol % of the diene units built into the polymer are in the 1,4-configuration.

8 Claims, No Drawings

TERPOLYMERS OF ETHYLENE, BUTADIENE AND ISOPRENE AND A PROCESS FOR THEIR PREPARATION

This invention relates to terpolymers of ethylene, butadiene and isoprene and to a process for their preparation. It relates in particular to terpolymers of ethylene, butadiene and isoprene having alternating diolefin-ethylene units so that the polymer according to the invention contains about 50 mol % of ethylene.

Alternating ethylene/butadiene copolymers have been described by G. Natta et al: Makromol. Chem. 79, 161 (1964). When the butadiene unit is in the trans-1,4-configuration, the products are crystalline with a melting point of 60°–65° C.

Ethylene-isoprene and ethylene-butadiene copolymers are known from German Offenlegungsschriften Nos. 2,113,164 and 2,128,804. The products described in these Offenlegungsschriften are prepared by means of titanium catalysts. Both the methods of preparation and the products, however, have numerous disadvantages. The structure of the alternating diolefin-ethylene copolymers is not stereospecific, i.e. more than 10% of the diolefin units are in the 1,2- or 3,4-configuration. Another disadvantage of the described process is that statistical copolymers are formed in addition to the alternating ethylene-diolefin copolymers and must be removed from them by dissolving.

Terpolymers of ethylene, butadiene and isoprene containing alternating ethylene-diolefin sequences have not hitherto been disclosed. The terpolymers according to the invention are characterized by containing generally from 45 to 55 mol-% of ethylene units, the ethylene content preferably being 50 ±2 mol-%. Furthermore, the copolymers according to the invention generally contain about 2–48 mol-% of butadiene and 48 to 2 mol-% of isoprene. More than 95% of the diolefin units of the polymer have the 1,4-configuration; less than 5 mol-% of the diolefin units are in the 1,2- or 3,4-configuration. The molecular structure of the terpolymers according to the invention may be substantially described by the following formula:

$$\mathrm{+[1,4\text{-}butadiene\text{-}ethylene]}_m\mathrm{[1,4\text{-}isoprene\text{-}ethylene]}_n\text{-}$$

Such alternating diolefin-ethylene units amount to more than 80 mol-%, preferably more than 90 mol-%. The terpolymers according to the invention are also distinguished by their very regular arrangement of the monomer units.

One advantage of the terpolymers according to the invention is that the butadiene content and isoprene content in the polymer can be varied by suitable choice of the conditions employed for the preparation of the terpolymers. The properties such as crystallinity and elasticity may thereby be controlled so that the terpolymers according to the invention may selectively have elastomeric, thermoelastic or thermoplastic properties. It was found that, as the proportion of 1,4-isoprene units increases, the melting point of the products, determined by DSC measurements (DSC=differential scan calorimetry), decreases, which is advantageous for using the products as elastomers. On the other hand, the crystallinity of the products may be increased by reducing the 1,4-isoprene content, thereby imparting greater strength, for example, to molded articles or films produced from them.

The present invention provides ethylene-butadiene isoprene terpolymers which consist to an extent of more than 80 mol-% of alternating ethylene-diene units and in which more than 95 mol-% of the diene units of the polymer are in the 1,4-configuration.

It was found that such novel terpolymers may be prepared in the presence of certain vanadium catalysts, the method of preparation constituting another object of this invention.

The process according to the invention for the preparation of the terpolymers is characterized in that polymerization is carried out in the presence of a catalyst consisting of (a) a vanadium compound of the formula VO(OR)$_2$X and (b) an organic aluminum compound of the formulae HAlR'$_2$, AlR'$_3$, R'$_2$AlY.

The molar ratio of b/a is in the range of from 100:1 to 1:10, preferably from 10:1 to 1:1.

The substituent R in the above formula denotes a straight chain, branched or cyclic alkyl group having 1–20 C-atoms, preferably 1–10, most preferably 4–10 C-atoms.

The alkyl groups are preferably branched. The substituent X denotes a halogen group (e.g. chlorine, bromine). The groups R may be identical or different.

The substituent R' denotes a straight chain, branched or cyclic alkyl group having 1–8 C-atoms. Y denotes a halogen group (e.g. chlorine, bromine, iodine).

The following are mentioned as examples of vanadium compounds (a):
dimethoxyvanadium oxychloride,
diethoxyvanadium oxychloride,
dipropoxyvanadium oxychloride,
di-isopropoxyvanadium oxychloride,
di-butoxyvanadium oxychloride,
di-isobutoxyvanadium oxychloride,
di-sec.-butoxyvanadium oxychloride,
di-tert.-butoxyvanadium oxychloride,
dipentyloxyvanadium oxychloride,
di-isoamyloxyvanadium oxychloride,
di-neopentyloxyvanadium oxychloride,
dihexyloxyvanadium oxychloride,
di-(2-ethylhexyloxy)-vanadium oxychloride,
di-(2-methylbutyloxy)-vanadium oxychloride,
di(2-ethylbutoxy)-vanadium oxychloride.

Compounds in which the group R is branched, such as the following, are preferred:
diisobutoxyvanadium oxychloride,
dineopentyloxyvanadium oxychloride,
di-(2-ethylhexyloxy)vanadium oxychloride,
di-(2-methylbutyloxy)vanadium oxychloride,
di-(2-ethylbutyloxy)vanadium oxychloride.

The following are given as examples of aluminum compounds (b):
trimethylaluminum,
triethylaluminum,
tripropylaluminum,
tributylaluminum,
triisobutylaluminum,
tricyclohexylaluminum,
trioctylaluminum,
diisobutylaluminum hydride,
diisobutylaluminum chloride,
diethylaluminum chloride,
diethylaluminum bromide, diethylaluminum iodide.

Triisobutylaluminum is particularly preferred.

Catalyst component (a) is preferably used in quantities of from 0.01 to 15 mMol, based on 100 g of ethylene, most preferably in quantities of from 0.1 to 10 mMol.

The process according to the invention is further characterized in that polymerization is carried out in solution. This includes those cases in which the product formed precipitates in the course of the reaction. Suitable solvents include aromatic, cycloaliphatic and aliphatic solvents, e.g. benzene, toluene, pentane, hexane, heptane and cyclohexane, and chlorinated hydrocarbons such as dichloromethane or chlorobenzene. Polymerization may also be carried out in excess monomers. The reaction is carried out at temperatures ranging from $-80°$ C. to $100°$ C., optionally under pressure. Temperatures in the range of from $-60°$ C. to $60°$ C. are preferred. In a preferred embodiment of the invention, the isoprene and butadiene are introduced into a reaction vessel together with the catalyst, optionally in a solvent, and ethylene is added until the desired degree of conversion has been obtained. According to another preferred embodiment, isoprene and the catalyst are introduced into the reaction vessel, optionally in a solvent, and the ethylene and butadiene are added simultaneously and at a uniform rate. If desired, however, the process may be carried out as a conventional solution polymerization in which the monomers are introduced into the reaction vessel with solvents and the catalyst is subsequently added.

The diolefins are used in excess, i.e. the molar ratio of diolefins to ethylene is greater than 1:1, preferably from 1.1:1 to 100:1.

After termination of polymerization, the catalyst is inactivated in the usual manner by the addition of amines, alcohols or carboxylic acids, such as triethylamine, ethanol or formic acid. The product according to the invention may be isolated by precipitation or stripping after the addition of a stabilizer, e.g. 2,6-di-tert.-butyl-methyl phenol. The whole process of polymerization and working up may be carried out either batchwise or continuously.

The terpolymers according to the invention are suitable for use as synthetic rubbers, thermoplastic elastomers or thermoplastic materials. They can be processed and vulcanized in the usual manner. The products may be used for the manufacture of moulded articles, films, motor car tires and technical rubber articles, depending on their properties.

EXAMPLE 1

500 ml of anhydrous n-hexane, 136 g of isoprene and 55 g of butadiene were introduced into a dry flask under an atmosphere of nitrogen at $-30°$ C. About 10 g of ethylene were introduced within 30 minutes after the addition of 10 mMol of triisobutylaluminum and 1 mMol of dineopentyloxyvanadium oxychloride.

The resulting suspension was stirred for a further 10 minutes after the addition of ethylene had been completed. After the addition of 2,6-di-tert.-butyl-methyl phenol as a stabilizer, the product was precipitated in alcohol and dried under vacuum at $50°$ C. 30 g of a rubber-like polymer were obtained. The intrinsic viscosity $[\eta]$ determined in toluene at $25°$ C. was 2.40 dl/g. $^1$H-NMR measurements showed the following composition (given in mol-%):

Ethylene 50.8; 1,4-butadiene 38.0; 1,4-isoprene 10.3; 1,2-butadiene 0.8; 3,4-isoprene <0.1.

The following results were obtained from DSC analysis (rate of heating 32 K/min); onset of melting $-24°$ C., melting point $35°$ C., melting enthalpy 50 J/g.

EXAMPLE 2

Same as Example 1 but using 68 g of isoprene instead of 136 g. A solid product having the following composition (mol-%) was isolated: ethylene 49.6; 1,4-butadiene 43.3; 1,4-isoprene 6.3; 1,2-butadiene 0.7; 3,4-isoprene <0.1. The following results were obtained from a DSC measurement: onset of melting $-9°$ C., melting point $52°$ C., melting enthalpy 63 J/g.

EXAMPLE 3

Same as Example 1 but using 68 g of isoprene, 110 g of butadiene and 15 g of ethylene. 44 g of a thermoplastic polymer were obtained on working up. $[\eta]$ (toluene, $25°$ C.): 2.54 dl/g. Composition (mol-%): ethylene 51.3; 1,4-butadiene 44.0; 1,4-isoprene 3.8; 1,2-butadiene 0.8; 3,4-isoprene <0.1. DSC measurements: onset of melting $3°$ C., melting point $63°$ C., melting enthalpy 70 J/g.

Examples 1 to 3 show that the 1,4-isoprene content of the product may be influenced by varying the monomer ratio of butadiene/isoprene. Increasing quantities of isoprene in the product lower its melting point and produce a rubber-like character.

EXAMPLE 4

Same as Example 1 but the substances first introduced into the reaction vessel consisted of 500 ml of n-hexane, 170 g of isoprene and 15 g of butadiene. After the addition of 8 mMol of i-Bu$_3$Al and 1 mMol of dineopentyloxyvanadium oxychloride, about 20 g of ethylene were introduced at $-30°$ C. over a period of 60 minutes. Working up as in Example 1. Yield: 67 g; $[\eta]$ (toluene, $25°$ C.): 1.84 dl/g. Composition in mol-%: ethylene 50.9; 1,4-butadiene 11.9; 1,4-isoprene 36.2; 1,2-butadiene 0.4; 3,4-isoprene 0.6.

EXAMPLE 5

The following were introduced into a dry flask under nitrogen: 1000 ml of n-hexane, 68 g of isoprene, 55 g of butadiene, 10 mMol of i-Bu$_3$Al and 1 mMol of dineopentyloxyvanadium oxychloride. About 20 g of ethylene were introduced over a period of 60 minutes at $-30°$ C. Subsequent procedure analogous to Example 1. Yield: 44 g; $[\eta]$ (toluene, $25°$ C.): 2.35 dl/g. Composition in mol-%: ethylene 51.5; 1,4-butadiene 40.4; 1,4-isoprene 7.5; 1,2-butadiene 0.5; 3,4-isoprene <0.1.

EXAMPLE 6

The following were introduced into a dry flask at $-20°$ C. under nitrogen: 500 ml of n-hexane, 102 g of isoprene, 10 mMol of i-Bu$_3$Al and 1 mMol of dineopentyloxyvanadium oxychloride. 50 g of butadiene and 20 g of ethylene were introduced simultaneously and at a uniform rate within 60 minutes. Working up as in Example 1. 48 g of rubber having a Mooney viscosity of ML 1+4/100° C.: 54 were obtained. $[\eta]$ (toluene, $25°$ C.): 1.83 dl/g. Composition (mol-%): ethylene 50.7; 1,4-butadiene 29.9; 1,4-isoprene 18.2; 1,2-butadiene 0.7; 3,4-isoprene 0.5.

We claim:

1. A process for preparing a terpolymer of ethylene, butadiene and isoprene which comprises polymerizing said monomers in solution at a temperature of from −80° to 100° C. in the presence of a catalytic amount of a catalyst consisting of
  (a) a vanadium compound of the formula VO(OR)$_2$X and
  (b) an organic aluminum compound of the formula AlR'$_3$, HAlR'$_2$ or R'$_2$AlY,
wherein
  R is alkyl having 1–20 C-atoms,
  X is a halogen group,
  R' is alkyl having 1–8 C-atoms, and
  Y is halogen,
the molar ratio of (b) to (a) being from 100:1 to 1:10.

2. A process of claim 1 wherein said catalyst consists of di-neopentyloxyvanadium oxychloride, di-(2-ethylhexyloxy)-vanadium oxychloride or a mixture thereof and triisobutylaluminum.

3. The process of claim 1 wherein polymerization is carried out at a temperature of from −60° to 60° C.

4. The process of claim 1 wherein the molar ratio of (b) to (a) in the catalyst system is within the range of from 10:1 to 1:1.

5. The process of claim 1 wherein the molar ratio of butadiene and isoprene to ethylene during polymerization is greater than 1:1.

6. The process of claim 1 wherein the molar ratio of butadiene and isoprene to ethylene during polymerization is from 1.1:1 to 100:1.

7. The process of claim 1 wherein the butadiene, isoprene and catalyst are first introduced into a reaction zone and ethylene is then added.

8. The process of claim 1 wherein isoprene and the catalyst are introduced into the reaction zone and butadiene and ethylene are then added simultaneously.

* * * * *